No. 772,052. PATENTED OCT. 11, 1904.
T. O. PERRY.
WINDMILL.
APPLICATION FILED APR. 12, 1902.
NO MODEL. 7 SHEETS—SHEET 1.

Fig. 1.

Witnesses:
J. B. Weir
C. W. Smith

Inventor:
Thomas O. Perry.

No. 772,052. PATENTED OCT. 11, 1904.
T. O. PERRY.
WINDMILL.
APPLICATION FILED APR. 12, 1902.
NO MODEL. 7 SHEETS—SHEET 2.

Witnesses:
JB Weir
OW Smith

Inventor:
Thomas O. Perry.

No. 772,052. PATENTED OCT. 11, 1904.
T. O. PERRY.
WINDMILL.
APPLICATION FILED APR. 12, 1902.
NO MODEL. 7 SHEETS—SHEET 4.

Witnesses:

Inventor:
Thomas O. Perry.

No. 772,052. PATENTED OCT. 11, 1904.
T. O. PERRY.
WINDMILL.
APPLICATION FILED APR. 12, 1902.
NO MODEL. 7 SHEETS—SHEET 6.

Witnesses:
J B Weir
C W Smith

Inventor:
Thomas O. Perry.

No. 772,052. PATENTED OCT. 11, 1904.
T. O. PERRY.
WINDMILL.
APPLICATION FILED APR. 12, 1902.
NO MODEL. 7 SHEETS—SHEET 7.

Witnesses:
J B Weir
C W Smith

Inventor:
Thomas O. Perry.

No. 772,052.                                                                                          Patented October 11, 1904.

UNITED STATES PATENT OFFICE.

THOMAS O. PERRY, OF CHICAGO, ILLINOIS.

WINDMILL.

SPECIFICATION forming part of Letters Patent No. 772,052, dated October 11, 1904.

Application filed April 12, 1902. Serial No. 102,608. (No model.)

*To all whom it may concern:*

Be it known that I, THOMAS O. PERRY, a citizen of the United States, residing at No. 1025 Park avenue, Chicago, county of Cook, and State of Illinois, have invented a new and useful Windmill, of which the following is a specification.

My invention relates to improvements in windmills in which the sails are pivoted in the wheel and adjusted to receive the wind at various angles suited to the varying conditions of wind velocity and speed requirements; and the objects of my improvements are, first, to provide for automatically changing the weather angles of the sails from positions suited to easily starting motion to other angles better suited to efficiency after the wheel gains motion and, vice versa, to provide for having the sails automatically assume the better weather angles for starting motion whenever the motion of the wheel ceases or is unduly retarded; second, to provide further automatic regulation of the weather angles of the sails for preventing excess of motion in wind of high velocity or for maintaining motion which shall not exceed a desired maximum in any wind, and, third, to provide for increased efficiency, durability, and reduction of expense in construction through various devices hereinafter described. I attain these objects by the mechanism illustrated in the accompanying drawings, in which—

Fig. 10, a sectional rear view of the spider, taken in a plane 10 10 on Figs. 5 and 6; Fig. 11, a sectional rear view of the spider, taken in a plane 11 11 on Figs. 5 and 6; Fig. 15, a plan of centrifugal governor-weight looking toward axis of wind-wheel, and Fig. 16 a plan of the regulating-lever.

Similar letters refer to similar parts throughout the several views.

The body of the turn-table or main supporting-frame of the windmill D sets over and turns upon a fixed tower-tube A, which constitutes the upper extremity of the tower. Preferably a supporting-tower shoulder A' is secured around the tower-tube just below the lower end of the turn-table. A wind-vane V, extending rearward, is rigidly fixed to the turn-table. The main shaft M of the wind-wheel as designed for pumping carries a pinion M' at its rear end and has its rear bearing in an inclosing pipe B, which is secured to the turn-table by the clamp $B^4$. Just back of the wind-wheel spider H a clamp $B^3$ is secured to the pipe B, and from this clamp two stay-rods T extend upward and rearward to either side of a fulcrum-arm $D^2$, which extends upward and forward from the turn-table body. Two other stay-rods, T', extend from either side of the fulcrum-arm rearward and downward to the tail-bone V', which holds the vane V. The upper end of the fulcrum-arm is extended laterally some distance to separate the connecting points of the rods on either side, so as to form one side of a triangle with the rods converging to the clamp and also with the rods converging to the tail-bone. A rock-arm R, with bearings laterally separated some distance, is hinged to the top of the fulcrum-arm $D^2$, a pivot-rod with nutted ends passing through the rock-arm bearings and fulcrum-ears and serving to secure also the stay-rods. A pump-rod $r$, extending down through the tower-tube, is pivotally connected with the rock-arm between its extremities. A gear-wheel K, meshing with the pinion M', is carried by a shaft K', having its bearing on one side of the body of the turn-table. The gear-wheel K carries a crank $K^2$, which is connected with the rear end of rock-arm R by means of a pitman P, having universal-jointed connections at both ends. The universal joint at either end of the pitman is preferably made by a small bearing-piece P' or $P^2$, having two pin-holes barely passing at right angles to each other. Each end of the pitman is forked to receive the bearing-piece, which pivots on a pin secured to the pitman. At the upper end of the pitman the other hole in the bearing-piece receives a pin secured in the forked end of the rock-arm. At the lower end of the pitman the other hole in the bearing-piece receives the crank-pin. These universal-joint connections are rendered necessary on account of the rock-arm being pivoted at right angles to the crank-wheel shaft, and the rock-arm is thus pivoted in order that the fulcrum-arm may be in line for also supporting the wind wheel and vane through the stay-rods. These small bearing-pieces P' $P^2$ facilitate renewal of the bearings and effectively prevent any binding in the bearings or springing of the pitman due to strains or lack of accurate adjustments. By bolting the tail-bone on one side of the turn-table body and placing the crank-wheel bearing on the other side interference between the pitman and tail-bone is avoided and the upthrust of the pitman in pumping is never greatly out of vertical direction. The pin $y$, which rocks in the rock-arm, is made large enough to be pierced loosely by the pump-rod $r$, which has a nut or head secured to its upper end, thus forming a swivel-joint which allows the windmill to turn freely to the wind without twisting the pump-rod.

The wind-wheel spider is keyed to the forward end of the main shaft, which may have its bearing directly in the forward end of the inclosing pipe B, but is preferably supported on ball-bearings. The balls have their bearings between an externally-grooved ring B', secured around the end of the pipe B and a split ring $b$, the two parts of which are clamped into a recess of the spider H by means of a flanged ring $h$, screwed on over the projecting flange within which the recess is formed. Just in front of the spider H a miter gear-wheel J is journaled on the main shaft, which projects in front of the spider a short distance and is pierced by two small pins, between which the miter-gear is confined. Into this miter-gear mesh several miter-gear segments $S^2$, each of which is secured to the inner end of a sail-axle S', which extends radially outward and at its outer end is secured to the sail S. Each sail-axle has its bearings in a tubular arm $H^2$, whose inner end is clamped securely into the spider periphery H' by means of the clamping-ring $H^3$ and clamp-screws $H^5$, both the clamping-ring and spider having semicircular recesses which closely fit the tubular arms. This arrangement compels all of the several sails to turn alike in their angular movements about their radial axes, and the angular movements of all can be controlled through the one miter-gear, which is provided with an internal rack J', into which meshes a governor-pinion Y, carried on a stud $H^4$, held by an arm of the spider H. On the same stud $H^4$, just in front of the pinion Y and clutched therewith, is a spur gear-wheel X, which meshes into a pinion N', carried by a reduced extension of the main shaft. This pinion N' is integral with an internal spur gear-wheel N, which in turn meshes with the pinion $e$, fixed to the forward end of the governor-shaft $e$, having its bearings in a sleeve attached to an arm of the spider H and carrying at its rear end a spur gear-wheel E, which in turn meshes into a central governor-wheel G, which is normally free to revolve on the pipe B just back of the front bearing of the main shaft. Now it is evident that if the governor-wheel G by any means be held stationary or has its freedom of rotation impeded, so that it turns less rapidly than the wind-wheel, the direct and immediate consequence is a turning of the sails about their radial axes, causing the sail-faces to assume positions more nearly parallel with the direction of the wind, and the motion of the wheel will ultimately cease entirely unless the impeded governor-wheel is set free. When the governor-wheel is set free after retardation, it is brought back to its normal position by a recovery-spring $n$, preferably located just in front of the spur-wheel N and of spiral form, adapted to react between the gear-wheel and the shaft extension $M^2$. A large friction-disk G' is attached to the rear end of the governor-wheel G, and a smaller friction-disk $G^2$ is attached in front. A stationary friction-disk or thrust-collar $B^2$, corresponding with and facing the smaller disk $G^2$, is fixed on the pipe B, and a governor clutch-disk F, corresponding with and facing the larger disk G', is held against rotation on the pipe B, but can move longitudinally a limited distance sufficient for clutching and releasing the governor-wheel between the non-rotatable disks. The clutch-disk F has a hub extending rearward around the pipe B, and a furl-fork Q, just in front of the pipe-clamp $B^3$, connects with this hub by pins on each side. A rod Q', guided in the clamp $B^3$, just beneath the pipe, is fixed to the fork, and thus prevents rotation of the clutch-disk. The rear end of fork-rod Q' connects with one arm of an elbow-lever $q$, whose other arm connects with a vertical furl-rod $u$, guided near its lower end by passing loosely through a guide-lug $D^3$ on the lower end of the turn-table. A furl-ring O, flat and smooth on its upper surface, surrounds the tower-tube just below the lower end of the turn-table and is guided vertically in the tower-shoulder A', upon which the turn-table rests, by the guide-bars O'. The furl-rod $u$ just clears the upper surface of the furl-ring when the clutch-disk F is against the governor-clamp C and the governor-wheel is free. A furl-lever U, fulcrumed between its extremities on the tower-shoulder A', connects at one end with the guide-bars O' of the furl-ring and at the other end with a furl-wire $w$, which extends down to within easy reach of the ground. Tension applied to the furl-wire by means of a weight or otherwise will lift the furl-ring, push on the furl-rod, and cause the governor-wheel to be clamped between the non-rotating clutch-disk F and thrust-collar $B^2$ and to be retarded more or less in its rotation, according to the amount of tension applied to the furl-wire.

Automatic regulation is effected by means of centrifugal governor-weights W, hinged at their rear ends in a web of the spider H, and having short arms W' projecting inward, whose inner ends are connected by links $c$ to the governor-clamp C, which is guided axially inside of a cylindrical projection extending rearward from the arm-clamp $H^3$. The central portion of the governor-clamp C just clears the clutch-disk F when the governor-weights are drawn in toward the axis of the wheel to the limit of their movement in that direction by means of a regulating-spring $g$, which tends to rotate an equalizing-lever Z, fulcrumed centrally on the shaft extension $M^2$ just in front of the miter-gear J, and whose equidistant extremities are connected by links $z$ to the governor-weights near their forward ends. Thus connected both governor-weights must have equal radial movements and are controlled by the one regulating-spring $g$, whose outer extremity connects with the front end of a regulating-lever L, broadly hinged at its rear end in a transverse web of the spider H and receiving between its extremities a regulating-screw $s$, whose head is just outside of the peripheral rim of the spider. By means of this regulating-screw more or less tension can be given to the regulating-spring, which determines the speed of revolution, as whenever the centrifugal action of the governor-weights suffices to overcome the tension of the regulating-spring they act to clamp the governor-wheel between the non-rotating friction clutch-disks. The amount of back gearing from the unifying miter-gear to the governor-wheel is so great that a very slight friction between the disks holds the governor-wheel sufficiently to exert a powerful torsional force on the sails.

Figure 1:
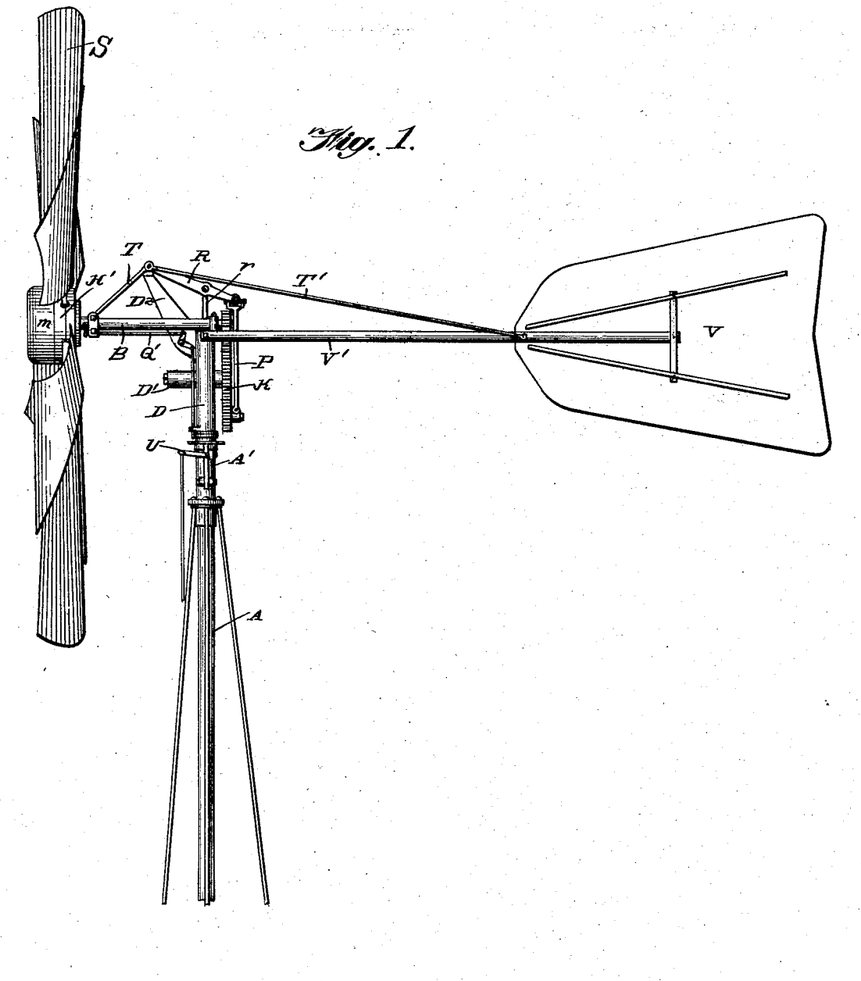
Figure 1 is a side elevation of the entire windmill shown as mounted on a tower-top.
Figures 2, 4:
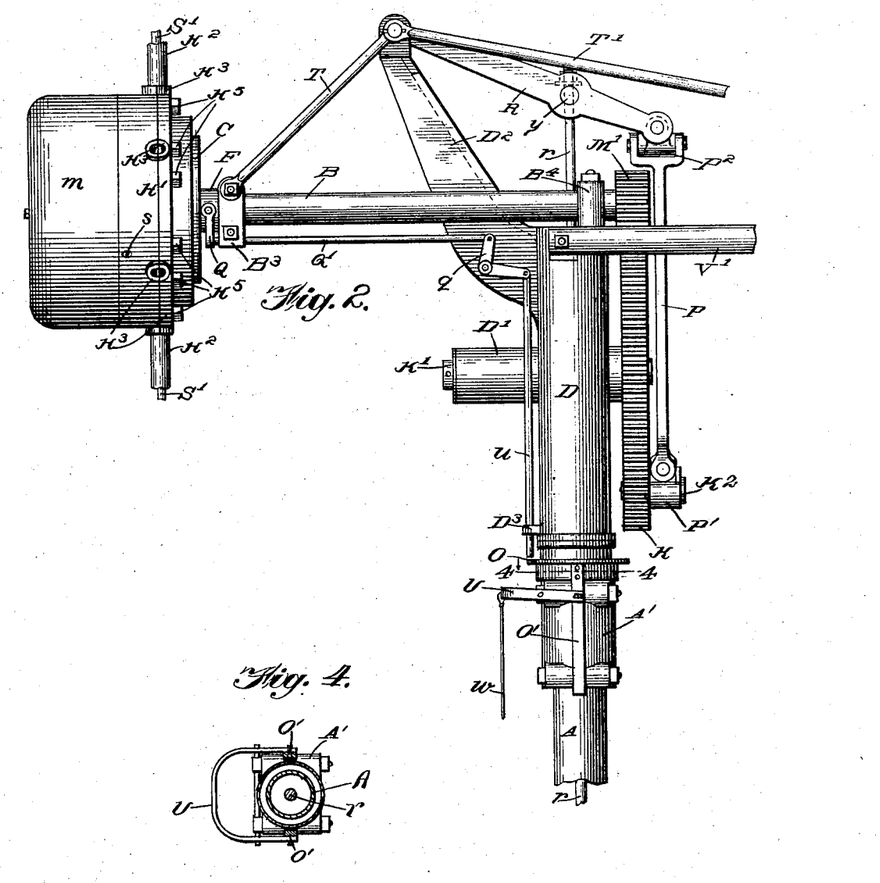
Fig. 2, an enlarged side elevation of the turn-table and parts immediately connected therewith, including the main shaft and spider of the wind-wheel, but omitting the sails and vane.
Fig. 4, a sectional plan of the furling-lever and supporting-tower shoulder.
Figure 3:
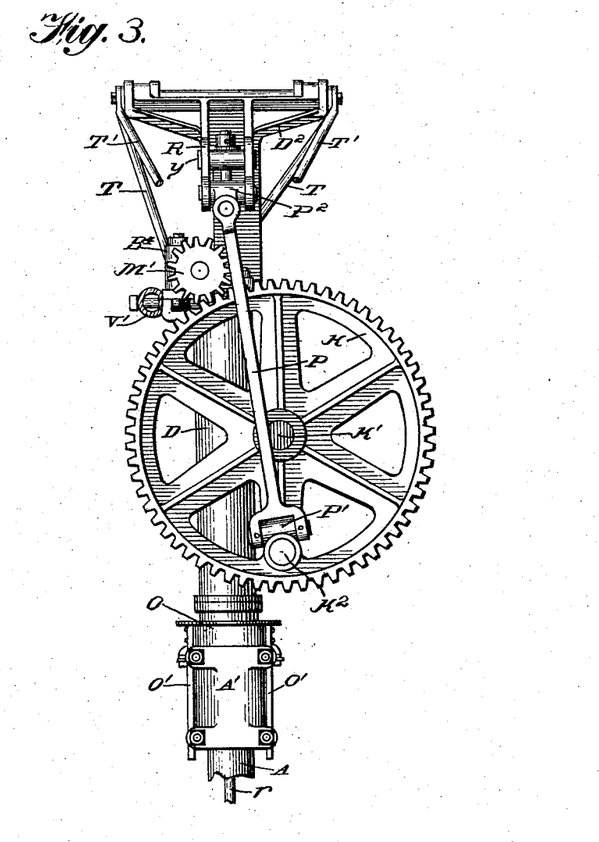
Fig. 3, a rear view of the parts shown in Fig. 2, omitting the spider.
Figure 5:
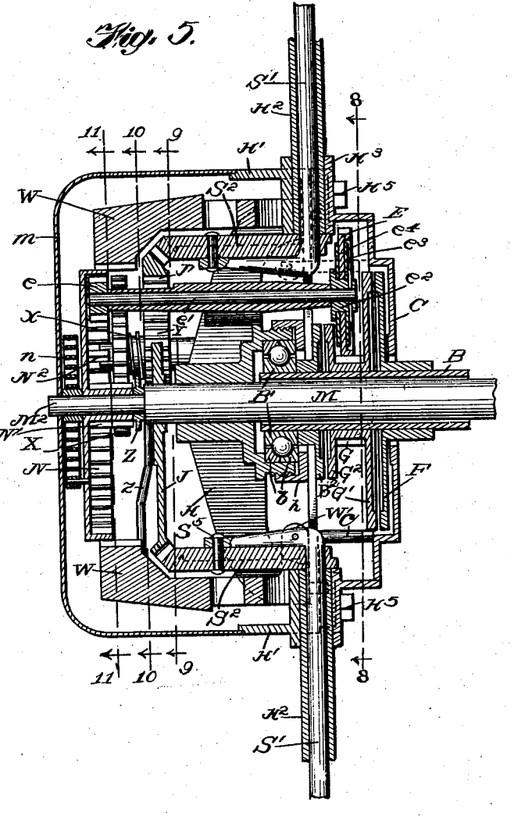
Fig. 5, a sectional view of the wind-wheel spider, taken in the plane of the axes of main shaft and governor-shaft $e'$.
Figure 6:
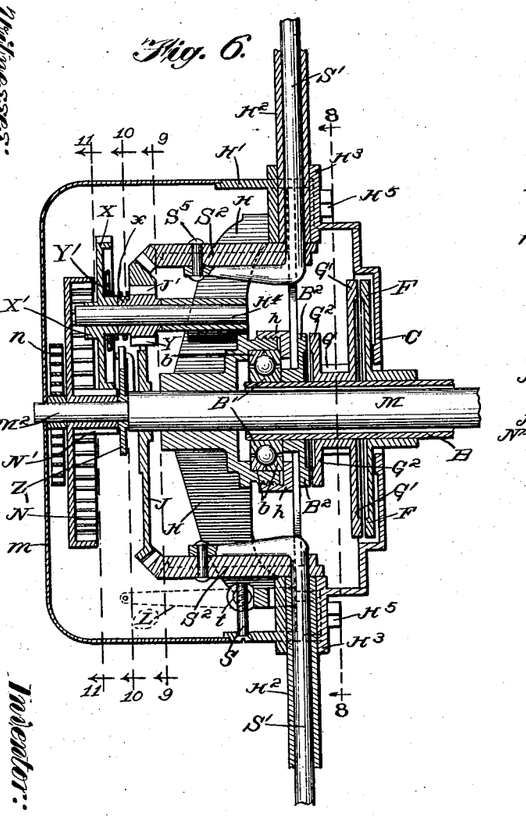
Fig. 6, a sectional view of the wind-wheel spider, taken in the plane of the axes of main shaft and stud $H^4$.
Figure 7:
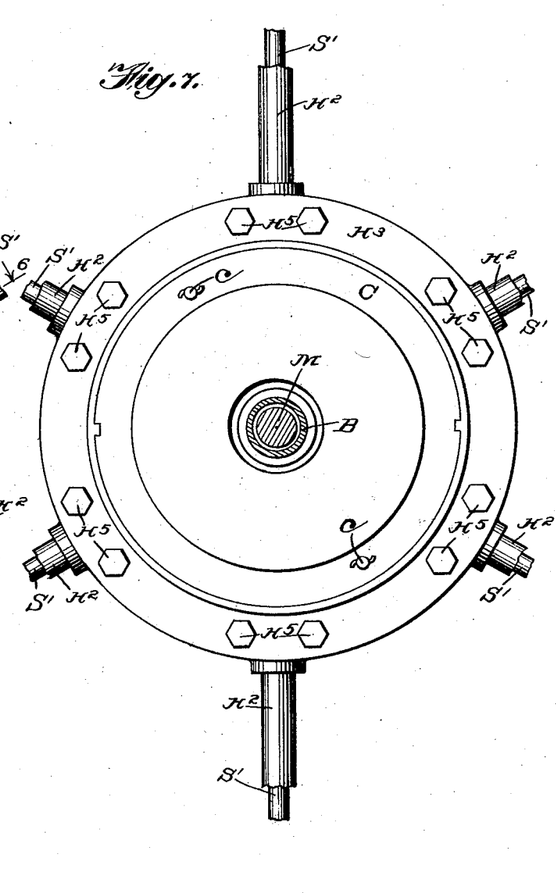
Fig. 7, an external rear view of the spider and governor-clamp.
Figure 8:
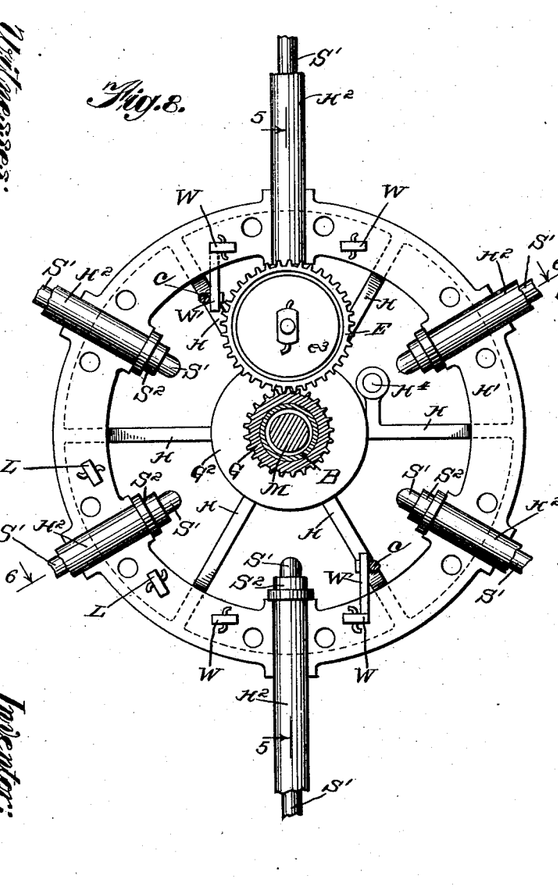
Fig. 8, a sectional rear view of the spider, taken in the plane 8 8 on Figs. 5 and 6, with arm-clamp removed.
Figures 9, 12, 13, 14:
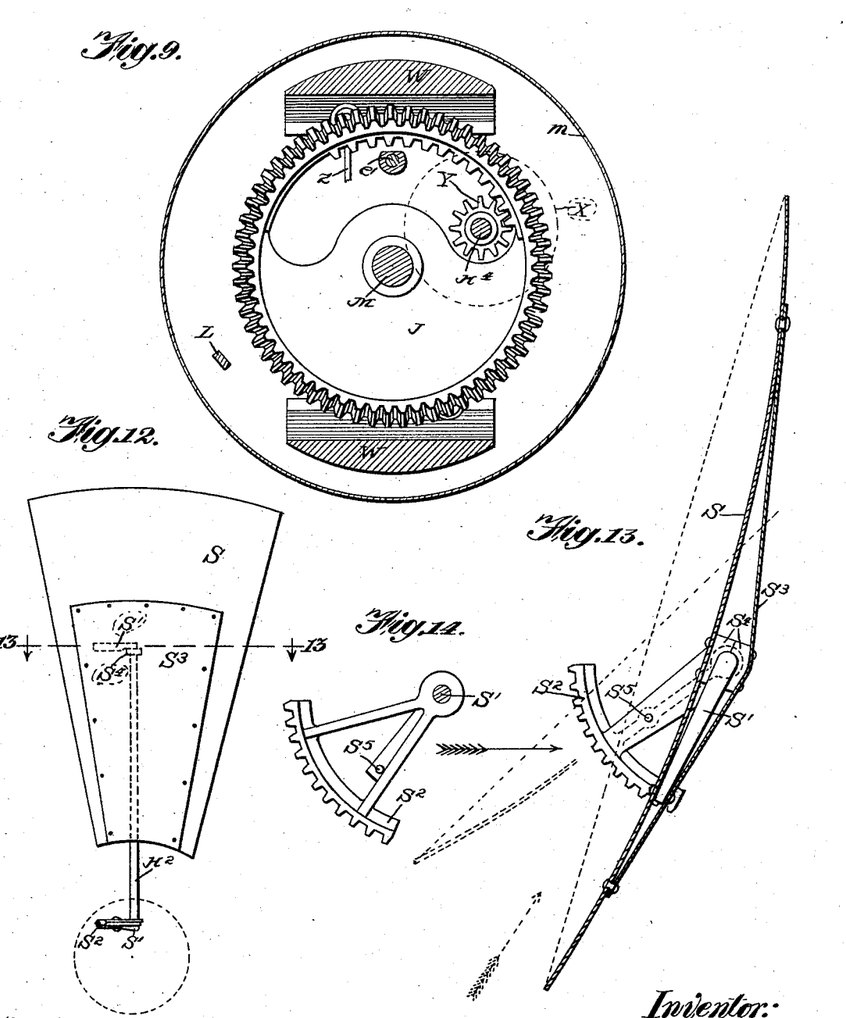
Fig. 9, a sectional rear view of the spider, taken in a plane 9 9 on Figs. 5 and 6.
Fig. 12, a rear view of one of the sails entire.
Fig. 13, an enlarged transverse section of a sail, taken in a plane 13 13 on Fig. 12, looking toward the center of the wheel.
Fig. 14, an alternate plan of miter-gear segment.
Figures 10, 11, 15, 16:
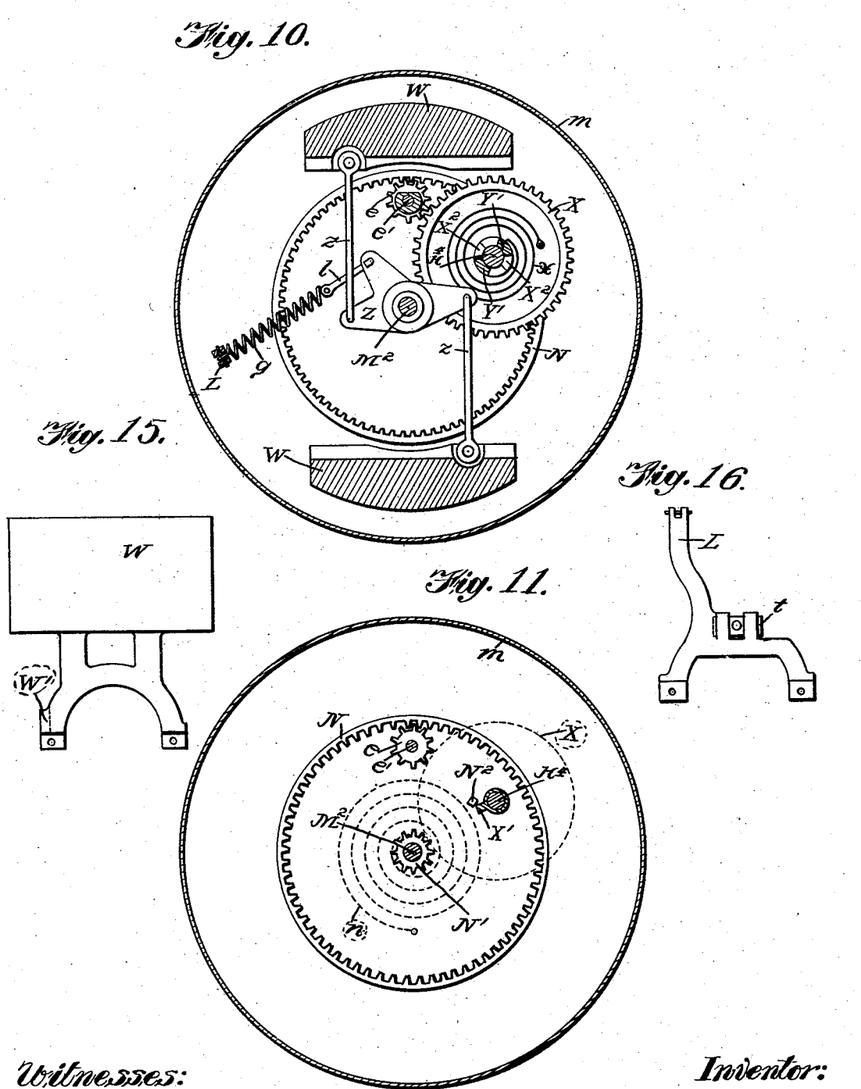

The spur gear-wheel X, which has been described as clutched to the pinion Y, might be integral therewith, so far as the governing action described above is concerned. The clutch provides for allowing the pinion Y a limited amount of free rotary movement with reference to the gear-wheel X. The shaded portions Y' of the clutch in Fig. 10 are the clutch-spurs of the pinion Y, cut off in the sectional view, and the similar unshaded clutch-spurs $X^2$ belong to the gear-wheel X. These two sets of clutch-spurs interlock, and the portion of circular zone not occupied by them indicates the amount of free vibratory rotation the pinion may have relatively to the gear-wheel. Therefore when the spur-gear X is at rest in normal position the unifying miter-gear and sails also have a corresponding limited amount of free vibratory movement. This has nothing to do with the sail-governing action previously described, but allows the sails collectively to assume within limits whatever angular position they will with reference to the wind. The action of the wind against the sails and their own tendency to turn on their radial axes when the wheel is in motion alone determines their angular inclination within the limits of free movement allowed by the clutch-spurs. It will be seen by reference to Figs. 12 and 13 that the sail is quite unevenly divided by its radial axis, the trailing portion behind the axis having considerably more area than the leading portion in front of the axis, and that the trailing portion when at rest receives the wind in a direction more nearly normal to its surface than does the leading portion and that these conditions tend to turn the sail about its radial axis to a position shown by the broken lines, which indicate the limit of free motion allowed by the clutch-spurs in that direction when the wheel is at rest under normal conditions with the governor-wheel free. The full lines show the limit of free motion allowed by the clutch-spurs in the opposite direction. So, obviously, whenever the wheel ceases motion for want of sufficient wind to turn it, the sails will tend to turn to the broken-line position, which represents a much better angle for starting the wheel into motion from a state of rest than do the full lines; but after the wheel has been set in motion the full-line position of the sail is much the better for efficient work. It is not so obvious to the uninitated that the sails will of their own accord assume the flatter angle of weather, as indicated by the full-line position, as soon as the wheel gains any considerable motion. Such, however, is the fact, and the knowledge gained by experience may be made to appear reasonable by observing that a partial vacuum is established between a fluid-current and a surface along which it flows and that the consequent suction becomes more pronounced toward the escaping side of the surface. The suction in some cases may even exceed and reverse the effect of direct pressure. If the sail were pivoted centrally, the air-currents would tend to hold its face normal to the direction of the wind. If the sail were pivoted slightly out of central, it would be held by the wind in a slightly-oblique position, not quite normal to the direction of wind, and it has been found necessary to pivot the sails as much out of central, as shown in Figs. 12 and 13, if it is desired to have wind-pressure alone set the sails when the wheel is at rest as oblique to the wind, as shown by the broken-line position of Fig. 13; but such one-sided position of the sail-pivots, as shown, will assure the sails assuming the greater weather angle of the broken-line position only when the wheel is at rest, or very nearly so. Under the best conditions for work when the wheel is in motion the direction of the wind relatively to the sail changes from that shown by the full-line arrow to that indicated by the broken-line arrow, and the relative velocity of the wind is also very much increased. The consequence is a strong tendency to deflect and hold the sail oblique with reference to the changed relative direction of the wind, just as it first tended to hold the sail to a certain degree of obliquity with reference to its original direction. So nothing more is needed to make the sails automatically assume the greater weather angle best for starting motion whenever the wind-wheel comes to rest and then take the flatter weather angle best for work whenever motion is gained than simply to allow the sails a certain amount of free angular movement between stops which determine the limits of the best starting and best working positions. Where sails are hinged radially, as shown, their own centrifugal action also tends to turn their faces to positions parallel to their plane of motion. The reason for this becomes obvious if we consider that each and every part of the sail recedes farther from the axis of the wheel by turning about its radial axis nearer into the plane of the wheel's revolution. This tendency is so great that it has proven to be an effective obstacle in the way of checking speed by the direct centrifugal action of weights of wind-wheels whose sails are hinged radially. It will be noticed that in our device the centrifugal governor-weights W merely make a connection which brings into play the power of the wheel to govern its own speed whenever there is an excess of motion and power to spare. It is in order that these centrifugal governor-weights may act very sensitively and perform their functions with slight variations of speed that the back gearing between the unifying gear-wheel J and the governor-wheel G is made so great. As shown, the ratio of angular movement between the governor-wheel and the unifying miter-gear or sails is as one hundred and ninety to one. With such great leverage it is not desirable that the rotary movement of the governor-wheel should be arrested by stops on the sails or unifying miter-gear. Therefore on the web of the internal spur-gear N is placed a spur $N^2$, which rests against a stop $X'$ on the hub of the spur-gear X, arresting motion due to the action of the wind or auxiliary spiral recovery-spring $n$ whenever the governor-wheel is free, and when the governor-wheel is held by friction due to tension applied to the furl-wire the spur $N^2$ comes in contact with the opposite side of the stop $X'$ after the gear-wheel N has made nearly four revolutions, or what is required to turn the sails parallel with the wind, so as to stop the wind-wheel. Ordinarily the wind-wheel would cease motion before the spur and stop come in contact; but in case it should not the governor-wheel must revolve with the wind-wheel by reason of the spur meeting the stop. A further safeguard against damage in case the wind-wheel should not cease motion when the spur and stop meet may be provided by attaching the spur-gear E to the shaft $e'$ by means of friction-plates $e^3$ and $e^4$, between which the web of the spur-gear E is clamped. The friction-plates are attached to the shaft and are made thin and elastic; but this further precaution is not necessary if care is taken not to apply excessive tension to the furl-wire. The spiral recovery-spring $n$ restores the sails to their working position, as shown by the full lines in Fig. 13, whenever the governor-wheel G is free; but as this recovery-spring needs to act only when the sails have a sharp weather angle, due to furling, the wind and centrifugal sail action also acts to restore the sails to a better working angle, so the recovery-spring is not an absolute necessity, but assists to prompt recovery of speed. In any event it only needs to have sufficient tension to barely overcome the friction of the governing parts when free. A spiral clutch-spring $x$, reacting between the pinion Y and spur-gear X and tending to hold the pinion at one angular limit of its free movement, may also be used to assist the wind in placing the sails at the best weather angle for starting motion whenever the wind-wheel comes to rest with governor-wheel free, and if the clutch-spring $x$ is used the sails need not necessarily be pivoted out of center. The spring $x$ may also be depended upon to always place the sails in the broken-line position of Fig. 13 without waiting for the assistance of wind action whenever motion ceases with governor-wheel free.

The clutch construction, which allows a limited free movement of pinion Y, serves all the sails in common, while all are compelled to turn alike about their radial axles. This arrangement is considered preferable; but in Fig. 14 an alternate construction is shown to better illustrate the essential action involved. Instead of providing for a limited free movement of the pinion Y each sail may have its own individual limited freedom of weather-angle movement if the sail-axle $S'$ is made to turn loosely in the hub of the miter-gear segment $S^2$ and the pin $S^5$, fixed in the bent end of the sail-axle, is simply stopped between shoulders on the segment. Thus each sail would place itself wherever it might be held by the wind within the limits of its free movement with respect to its miter-gear segment, and the same action as previously described would result, with the exception that the sails would act individually instead of collectively. Fig. 13 shows that the sail is transversely curved, so that in its best working position when in motion the leading margin may be about parallel with the relative direction of wind, while the trailing margin is about parallel with the plane of its own motion. This form is much more efficient for work than a plain sail, though the mechanism previously described for controlling the weather angles is effective with any form of radially-pivoted sail. Figs. 12 and 13 also show how the tubular arm H² is inclosed between the sail S and an arm-shield S³, riveted to the back of the sail in such a manner as to give great stiffness, and, what is even more important, act as a shield to the tubular arm, which would otherwise form a shoulder on the back of the sail, greatly to the detriment of its efficiency. Dynamometric experiments have shown that a shoulder on the back of a sail, such as an ordinary sail-arm of prevailing use, may cause a loss of efficiency amounting in some instances of record to more than thirty per cent. It is of the greatest importance that the air-currents meeting or flowing along the back of the sail shall encounter no obstruction which will prevent a smooth continuous flow. The back of the sail, as well as its face, helps to change the direction of the air-currents clinging to its surface and discharge them from its trailing margin in a direction opposite to the sail's motion as required for greatest efficiency. The outer end of the sail-axle after passing through a clamp S⁴, by which it is secured with rivets to both the sail S and shield S³, is bent sharply at right angles to its radial direction and secured at its extremity between the sail and shield. The clamp S⁴ rests against the outer end of the tubular arm and is located on the sail, preferably near its center of wind-pressure, so that the sail needs no other support, but may have a loose bearing on the tube at its inner end. The outer margin of the shield extends a short distance beyond the clamp S⁴ and is drawn down close to the sail with rivets, as are also both sides. The clamp separates the sail and shield sufficiently to prevent binding on the tubular arm.

A cover m, matching the periphery H' of the spider, serves to inclose and protect the entire governing mechanism.

In the preceding specification the term "windmill" refers to the entire mechanism. The term "wind-wheel" embraces the sails, spider, main shaft, and parts immediately connected and revolving therewith. The term "weather angle" means the angle made by the face of a sail with the plane of the wind-wheel.

What I claim, and desire to secure by Letters Patent, is—

1. In a wind-wheel, the combination of the sails pivoted radially, and the sail-supports, with governing mechanism for limiting the wheel's speed of revolution, said sails when unfurled and not governed by said governing mechanism having an independent angular movement restricted between the limits of a greater weather angle better suited to starting motion and a lesser weather angle better adapted for work, when the wheel is in motion, substantially as herein set forth.

2. In a wind-wheel, the combination of the sails pivoted radially, and the sail-supports, with governing mechanism for limiting the wheel's speed of revolution, said sails when unfurled and not governed by said governing mechanism having an independent angular movement restricted between the limits of a greater weather angle better suited to starting motion and a lesser weather angle better adapted for work when the wheel is in motion, and means for setting the sails at the greater weather angle for starting motion, substantially as herein set forth.

3. In a wind-wheel, the combination of the sails pivoted radially on one side of their radial center lines, and the sail-supports, with governing mechanism for limiting the wheel's speed of revolution, said sails when unfurled and not governed by said governing mechanism having an independent angular movement restricted between the limits of a greater weather angle better suited to starting motion and a lesser weather angle better adapted for work, when the wheel is in motion, substantially as herein set forth.

4. In a wind-wheel, the combination of the sails pivoted radially on one side of their radial center lines, and the sail-supports, with governing mechanism for limiting the wheel's speed of revolution, said sails when unfurled and not governed by said governing mechanism having an independent angular movement restricted between the limits of a greater weather angle better suited to starting motion and a lesser weather angle better adapted for work, when the wheel is in motion, and means for assisting the wind to set the sails at the greater weather angle for starting motion, substantially as herein set forth.

5. In a wind-wheel, the combination of the sails pivoted radially, and the sail-supports, with governing mechanism for limiting the speed of revolution by controlling the weather angle of the sails, one element of said speed-governing mechanism having an independent vibratory movement limited with reference to one of its adjoining elements by shoulders on said two adjoining elements whereby the sails when unfurled and ungoverned as to speed are permitted to assume at one vibratory limitation a greater weather angle better suited to starting motion and at the other vibratory limitation a lesser weather angle better adapted for work when the wheel is in motion, substantially as herein set forth.

6. In a wind-wheel, the combination of the sails pivoted radially, and the sail-supports, with governing mechanism for limiting the speed of revolution by controlling the weather angle of the sails, one element of said speed-governing mechanism having an independent vibratory movement limited with reference to one of its adjoining elements by shoulders on said two adjoining elements whereby the sails when unfurled and ungoverned as to speed are permitted to assume at one vibratory limitation a greater weather angle better suited to starting motion and at the other vibratory limitation a lesser weather angle better adapted for work when the wheel is in motion, and means for setting the sails at the greater weather angle for starting motion, substantially as herein set forth.

7. In a wind-wheel, the combination of the pivoted sails, and the sail-supports, and the turn-table carrying the wind-wheel, with a non-rotative clutch connected with the turn-table, a governor-wheel connectible with the clutch but normally carried with the wind-wheel, reducing driving mechanism between the governor-wheel and pivoted sails whereby the weather angle of the sails is changed with angular motion greatly reduced relatively to the angular motion of the governor-wheel whenever the latter rotates relatively to the wind-wheel, and means whereby the clutch and governor-wheel may be connected for furling the sails, substantially as herein set forth 8. In a wind-wheel, the combination of the pivoted sails and wheel-frame and the turn-table support for the wind-wheel, with a non-rotative clutch connected with the support, a governor-wheel connectible with the clutch but normally carried with the wind-wheel, driving mechanism between the governor-wheel and pivoted sails whereby the latter are turned to change their weather angles whenever the governor-wheel rotates relatively to the wind-wheel, governor-weight carried by the wind-wheel and adapted to make connection by centrifugal action between the governor-wheel and clutch, and a spring which resists the centrifugal action of the governor-weight, substantially as herein set forth.

9. In a wind-wheel, the combination of the pivoted sails and wheel-frame and the turn-table support for the wind-wheel, with a non-rotative clutch connected with the support, a governor-wheel connectible with the clutch but normally carried with the wind-wheel, driving mechanism between the governor-wheel and pivoted sails whereby the latter are turned to change their weather angles whenever the governor-wheel rotates relatively to the wind-wheel, governor-weight adapted to make connection by centrifugal action between the governor-wheel and clutch, and means for returning the sails to working position when the centrifugal action of the governor-weights is sufficiently diminished, substantially as herein set forth.

10. In a wind-wheel, the combination of the pivoted sails, and the sail-supports, and the turn-table carrying the wind-wheel, with a train of reducing-gears carried by the wind-wheel and acting between the turn-table and the pivoted sails, whereby repeated revolutions of the wheel are required to effect a complete furling of the sails, and means for breaking and making connection between two consecutive elements in said train, substantially as herein set forth.

11. In a wind-wheel, the combination of the wheel-frame, and the pivoted sails and the support for the wind-wheel, with a train of transmission-gearing carried by the wind-wheel and acting between the pivoted sails and the support, whereby the weather angles of the sails may be changed, and centrifugal governor mechanism adapted to make and break connection between two consecutive elements of said train, substantially as herein set forth.

12. In a wind-wheel, the combination of the wheel-frame, and the pivoted sails and the support for the wind-wheel, with a train of transmission-gearing carried by the wind-wheel and acting between the pivoted sails and the support, whereby the weather angles of the sails may be changed, and centrifugal governor mechanism carried by the wind-wheel adapted to make and break connection between two consecutive elements of said train, substantially as herein set forth.

13. In a wind-wheel, in combination with the wheel-frame, and the pivoted sails elastically retained in working position, and the turn-table carrying the wind-wheel, with a train of reducing-gears carried by the wind-wheel and acting between the turn-table and the pivoted sails, whereby repeated revolutions of the wheel are required to effect a complete furling of the sails, and means for breaking and making connection between two consecutive elements in said train, substantially as herein set forth.

14. In a wind-wheel, the combination of the wheel-frame, and the pivoted sails elastically retained in working position, and the support for the wind-wheel, with a train of transmission-gearing carried by the wind-wheel and acting between the pivoted sails and the support, whereby the weather angles of the sails may be changed and centrifugal governor mechanism adapted to make and break connection between two consecutive elements of said train, substantially as herein set forth.

15. In a wind-wheel, the combination of the wheel-frame, and the pivoted sails elastically retained in working position, and the support for the wind-wheel, with a train of transmission-gearing carried by the wind-wheel and acting between the pivoted sails and the support, whereby the weather angles of the sails may be changed, and centrifugal governor mechanism carried by the wind-wheel adapted to make and break connection between two consecutive elements of said train, substantially as herein set forth.

16. In a wind-wheel, the combination of the wheel-frame, and the radially-pivoted sails, and a connecting element whereby the several sails are made to turn in unison about their radial axes, and a driving element for operating said connecting element, with actuating mechanism adapted to engage said driving element, and stops between said actuating mechanism and driving element whereby the latter, together with the connecting element and sails, is allowed a limited movement independent relatively of the movement of the actuating mechanism, substantially as set herein forth.

17. In a wind-wheel, the combination of the wheel-frame, and the radially-pivoted sails having segmental gears on the inner ends of their axles, and a connecting-gear whereby the several sails are made to turn in unison about their radial axes, and a driving-gear for operating said connecting-gear, with actuating mechanism adapted to engage said driving-gear, and stops between said actuating mechanism and driving-gear whereby the latter together with the connecting-gear and the sails is allowed a limited movement independent relatively of the movement of the actuating mechanism, substantially as herein set forth.

18. In a wind-wheel, in combination with the sail-arm and the radial sail, an arm-shield radially attached to the sail on opposite sides of the arm and inclosing the arm between itself and the sail, the surfaces of said shield sloping at an acute angle with the sail-surface from their lines of attachment toward the inclosed arm, as and for the purpose herein set forth.

19. In a wind-wheel, in combination with the sail-arm and the radial sail, an arm-shield radially attached to the sail on opposite sides of the arm and inclosing the arm between itself and the sail, the inclosed space being in transverse cross-section concave in front and convex on the back, substantially as and for the purpose herein set forth.

20. In a wind-wheel, the combination of the sails having radial supports along their backs, with shields whose radial edges are closely joined to the backs of the sails, said supports being inclosed between the sails and shields in inclosures of crescent cross-sections, as and for the purpose herein set forth.

21. In a wind-wheel, the combination of the spider and radially-pivoted sails, with tubular supports radiating from the periphery of said spider, sail-axles extending through and bearing in said tubular supports and rigidly attached at their outer extremities to the sails, shields closely attached along their radial edges to the sails, therewith inclosing the outer extremities of the sail-axles and sail-arms, and connections from the inner extremities of the sail-axles with mechanism for controlling the weather-angles of the sails, substantially as herein set forth.

22. In a wind-wheel, the combination of the spider and radially-pivoted sails, with tubular supports radiating from the periphery of said spider, sail-axles extending through and bearing in said tubular supports and rigidly attached at their outer extremities to the sails, shields closely attached along their radial edges to the sails, therewith inclosing the outer extremities of the sail-axles and sail-arms, segmental gears attached to the inner extremities of the sail-axles, and a gear-wheel journaled on the spider and meshing with the segmental gears, and connection from said gear-wheel with mechanism for controlling the weather-angles of the sails, substantially as herein set forth.

23. In a windmill, the combination of the turn-table, and the crank-wheel journaled thereon, with the rock-arm pivoted at one end on the turn-table with horizontal pivotal axis above and at about right angles to the axis of the crank-wheel, a pump-rod connected with the rock-arm between its extremities, and a pitman connecting the crank-wheel with the other extremity of the rock-arm, said other extremity and said pump-rod being located to work on one side of a vertical plane containing the axis of the crank-wheel, substantially as herein set forth.

24. In a windmill, the combination of the turn-table, and the crank-wheel journaled thereon, with the rock-arm pivoted at one end on the turn-table with horizontal pivotal axis above and at about right angles to the axis of the crank-wheel a pump-rod connected with the rock-arm between its extremities, and a pitman connecting the crank-wheel with the other extremity of the rock-arm, said other extremity and said pump-rod being located to work on one side of a vertical plane containing the axis of the crank-wheel, the connections at both ends of the pitman being doubly flexible, substantially as herein set forth.

25. In a windmill, the combination of the turn-table and the crank-wheel journaled thereon, with the wind-wheel-shaft bearing attached at its rear end to the turn-table, a rock-arm pivoted horizontally on the turn-table with pivotal axis above and at about right angles to the wind-wheel shaft, a fulcrum-arm extending up from the turn-table to the pivot of the rock-arm, suspending-rods extending down from the fulcrum-arm to the wind-wheel-shaft bearing, a pump-rod connected to the rock-arm between its extremities, and a pitman connecting the crank-wheel with the rock-arm, the connections at both ends of the pitman being doubly flexible, substantially as herein set forth.

26. In a wind-wheel, the combination with the wind-wheel support, and the wheel-frame, and the pivoted sails, of a train of governing mechanism carried by the wind-wheel, one element in said train of mechanism normally inactive with reference to the wind-wheel being adapted for operative connection with the wind-wheel support and said train of mechanism including reducing-gear whereby a great movement of said normally inactive element produces relatively a small angular movement of the sails, for the purpose of adjusting the weather-angles, substantially as herein set forth.

27. In a wind-wheel, the combination with the wind-wheel support and the wheel-frame and the pivoted sails of a train of governing mechanism carried by the wind-wheel, one element in said train of mechanism normally inactive with reference to the wind-wheel being adapted for operative connection with the wind-wheel support, for the purpose of adjusting the weather angles of the sails, and centrifugal weight for automatically making and breaking said operative connection, substantially as herein set forth.

28. In a wind-wheel, the combination of the wheel-frame, and the pivoted sails and governing mechanism for controlling the weather angle of the sails, with centrifugal weight for automatically setting said governing mechanism in action, said centrifugal weight and the governing mechanism actuated thereby being carried by the wind-wheel in a central inclosed chamber, substantially as herein set forth.

29. In a windmill, the combination with a wind-wheel having sails movable to an operative or inoperative position, of a drive-shaft operable by the wind-wheel, a driven shaft actuated from the drive-shaft, sail-operating mechanism, and a clutch mechanism controlled by the speed of the drive-shaft for actuating the sail-operating mechanism to move the sails into and out of operative position to automatically regulate the speed of the driven shaft, substantially as herein set forth.

30. In a windmill, the combination with the wind-wheel, of radially-pivoted sails movable to an operative or inoperative position, and drive-shaft operable by the wind-wheel, a driven shaft actuated from the drive-shaft, sail-operating mechanism, and a clutch mechanism controlled by the speed of the drive-shaft for actuating the sail-operating mechanism to move the sails into and out of operative position to automatically regulate the speed of the driven shaft, substantially as herein set forth.

31. In a windmill, the combination with the wind-wheel, of radially-pivoted sails movable to an operative or inoperative position, sail-operating mechanism, and a clutch mechanism controlled by the speed of the wind-wheel for actuating the sail-operating mechanism to move the sails into and out of operative position to automatically regulate the speed of the wheel, substantially as herein set forth.

32. In a windmill, the combination with the wind-wheel having sails movable to an operative or inoperative position, of a horizontal drive-shaft supporting the wind-wheel, sail-operating mechanism, and a clutch mechanism controlled by the speed of the drive-shaft for actuating the sail-operating mechanism to move the sails into and out of operative position to automatically regulate the speed of the wind-wheel, substantially as herein set forth.

THOMAS O. PERRY.

Witnesses:
 EVA B. JUDD,
 MARY F. LINCOLN.